(12) United States Patent
Melchior

(10) Patent No.: US 6,424,785 B1
(45) Date of Patent: Jul. 23, 2002

(54) FIBER-OPTIC ENDPIECE

(75) Inventor: Lutz Melchior, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/568,949

(22) Filed: May 11, 2000

Related U.S. Application Data

(63) Continuation of application No. PCT/DE98/03168, filed on Oct. 23, 1998.

(30) Foreign Application Priority Data

Nov. 11, 1997 (DE) .......................................... 197 50 757

(51) Int. Cl.$^7$ ................................................. G02B 6/36
(52) U.S. Cl. ........................... 385/139; 385/65; 385/71; 385/76; 385/83
(58) Field of Search ........................... 385/139, 55, 58, 385/59, 65, 70, 71, 77, 83, 85–87, 60, 78, 76

(56) References Cited

U.S. PATENT DOCUMENTS 5,257,334 A   10/1993   Takahashi .................... 385/65

FOREIGN PATENT DOCUMENTS

| CH | 676513 A5 | 1/1991 |
|---|---|---|
| DE | 25 25 132 | 5/1976 |
| EP | 0 241 724 A2 | 10/1987 |
| EP | 0 309 766 A2 | 4/1989 |
| EP | 0 760 488 A1 | 3/1997 |

OTHER PUBLICATIONS

International Publication No. WO 97/34179 (Hagan et al.), dated Sep. 18, 1997.
Patent Abstracts of Japan No. 58–105115 A (Akira et al.), dated Jun. 22, 1983.

*Primary Examiner*—Rodney Bovernick
*Assistant Examiner*—Michael J. Stahl
(74) *Attorney, Agent, or Firm*—Laurence A. Greenberg; Werner H. Stemer; Gregory L. Mayback

(57) ABSTRACT

A fiber-optic endpiece includes a base member and a fixing member which can be inserted in the base member. The base member has a coupling end face and a depression with a bottom surface and lateral guide structures. The bottom surface has a groove for accepting an optical waveguide. The depression, the groove, and the optical waveguide extend to the coupling end face. The fixing member has a front face, a rear face and guide faces. The guide faces interact with the guide structures such that the fixing member is clamped in the depression. The optical waveguide is thus clamped between the base member and the fixing member when the fixing member is inserted. The coupling end face of the base member and the front face of the clamped fixing member lie in a common plane when the fixing member is in an inserted position. The depression and the fixing member have respective cross sections which diminish uniformly along a longitudinal direction of the depression. The side with the reduced cross section is disposed opposite from the coupling end face.

3 Claims, 3 Drawing Sheets

FIBER-OPTIC ENDPIECE

CROSS-REFERENCE TO RELATED APPLICATION

This application is a continuation of copending International Application PCT/DE98/03168, filed Oct. 23, 1998, which designated the United States.

BACKGROUND OF THE INVENTION

Field of the Invention

The invention is in the field of optical waveguide interconnection technology, and is to be applied in the structural configuration of a fiber-optic endpiece. The fiber-optic endpiece includes a base member, which has a rear side and a coupling end face, a fixing member, having a front and a rear face, and at least one optical waveguide fixed in a groove between the base member and the fixing member.

In a conventional fiber-optic endpiece of this type, as is shown in International Publication No. WO 97/34179, the fixing member is pushed into a depression in the base member along the guide structures thereof, and clamped, in the pushed-in state, in the depression by interaction of its guide surfaces with the guide structures of the base member. The depression and the groove and the optical waveguide fixed therein extend up to the coupling end face. In this case, the cross section of the depression and of the fixing member diminishes along the depression in the direction of the coupling end face. The front face of the fixing member is wider than the cross-sectional width of the depression in the plane of the coupling end face, with the result that the fixing member cannot be pushed with its front face up to the coupling end face of the base member. Consequently, the optical waveguide or waveguides are exposed in a section between the front face of the fixing member and the coupling end face of the base member. During a subsequent polishing operation, there is the risk of the optical waveguides breaking off on the edge of the front face pointing in the direction of the optical waveguide.

From Published European Patent Application EP 0 760 488 A1 there is also known a fiber-optic endpiece which has a base member having a coupling end face and a depression. V-shaped grooves for holding optical fibers are provided in this depression. The optical fibers are pressed perpendicular to their longitudinal direction into the grooves by a pressure member having a press-on face and a front end face. The optical fibers are subsequently fixed permanently with an adhesive. The coupling end face of the base member, and the front end face of the pressure member lie in a common plane in this case. During production of this endpiece, it is necessary to maintain an external pressure force on the pressure member until the adhesive has hardened. This entails relatively long cycle and production times and furthermore makes it necessary to provide special production devices.

SUMMARY OF THE INVENTION

It is accordingly an object of the invention to provide a cost-effective fiber-optic endpiece which overcomes the above-mentioned disadvantages of the heretofore-known endpieces of this general type, and in which the optical waveguide is fixed uniformly along its contact lines in the form of a three-point mounting. The optical waveguide should be fixed up to its end, such that the end lies in the plane of a coupling end face, and such that the end is thereby protected against local overloading or overstressing by a tilting of the fixing member and/or against undesired stresses during the polishing operation.

With the foregoing and other objects in view there is provided, in accordance with the invention, a fiber-optic endpiece, which includes:
  a base member having a coupling end face, the base member formed with a depression defining a bottom surface and lateral guide structures, the bottom surface formed with a groove for accepting the optical waveguide, the depression defining a longitudinal direction;
  a fixing member having a front face, a rear face and guide faces, the fixing member being insertable into the depression along the lateral guide structures and defining an inserted position, the guide faces being adapted to the guide structures and interacting with the guide structures, the fixing member, when in the inserted position, being clamped in the depression for holding the optical waveguide in the groove;
  the depression, the groove and the optical waveguide extending to the coupling end face;
  the coupling end face and the front face defining a common plane, when the fixing member is in the inserted position; and
  the depression and the fixing member having respective cross sections, at least one of the respective cross sections diminishing in the longitudinal direction and having a side with a reduced cross section opposite from the coupling end face.

In other words, the object of the invention is achieved by providing the reduced cross section of the depression and/or of the fixing member such that it is opposite i.e. facing away from the coupling end face, and by providing the coupling end face of the base member, and the front face of the clamped fixing member such that they lie in a common plane.

Providing the front face of the clamped fixing member and of the coupling end face of the base member in a common plane creates a common coupling and processing face. After joining the base member and the fixing member, the optical waveguide can be polished at this face without any disadvantageous effects.

Due to the fact that the reduced cross section of the depression and/or of the fixing member is averted from the coupling end face, the fixing member must be pushed into the depression from the side of the coupling end face. This permits the exchange of defective optical waveguides at a later point in time. After the fixing member has been pushed out of the depression, the defective optical waveguide can be removed and exchanged for a non-defective one. If the fixing member projects beyond the coupling end face after being pushed in anew, the common coupling and processing face is created by a subsequent polishing.

An advantageous embodiment of the invention has a plurality of V-shaped grooves, running in a plane and parallel to one another, for a corresponding number of optical waveguides. The advantageous embodiment also has aligning devices which run parallel to the V-shaped grooves and are provided on the coupling end face. The aligning devices are provided in the plane of the grooves. As a result, any adjustment work, that is possibly required during the production process, can refer to a single plane as a reference plane.

In accordance with a further feature of the invention, the respective cross sections are trapezoidal cross sections transverse to the longitudinal direction. The trapezoidal cross sections have a bottom side at the bottom surface and a top side. The bottom side is wider than the top side.

Other features which are considered as characteristic for the invention are set forth in the appended claims.

Although the invention is illustrated and described herein as embodied in fiber-optic endpiece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
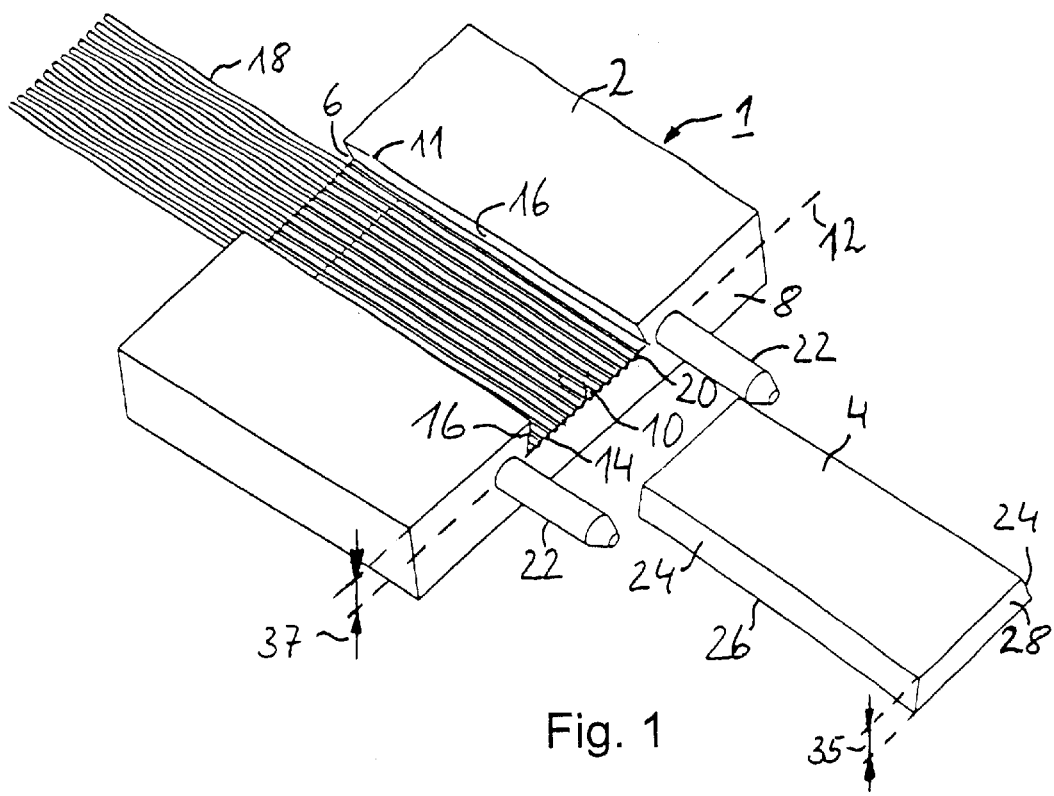
FIG. 1 is a perspective view of a fiber-optic endpiece according to the invention, with inserted optical waveguides.

Referring now to the figures of the drawings in detail and first, particularly, to FIG. 1 thereof, there is shown a fiber-optic endpiece 1 which includes a square base member 2 and a fixing member 4. Provided in the base member 2 is a depression 6 which extends through the entire base member 2 in one direction and leads to a free coupling end face 8 of the base member 2. Sunk into the bottom surface 10 of the depression 6 in a plane 12 are V-shaped longitudinal grooves 14 which likewise lead to the coupling end face 8 and traverse the entire depression 6. The side walls 16 of the depression 6 run towards one another from the bottom surface 10 to the top side 11, such that the cross-sectional profile perpendicular to the longitudinal grooves 14 is in the shape of a swallow's tail. Optical waveguides 18 whose ends 20 terminate with the coupling end face 8 are inserted into the longitudinal grooves 14. Aligning pins 22 which are aligned parallel to the optical waveguides 18 and project beyond the coupling end face 8 are provided in the plane 12 of the inserted optical waveguides 18 on both sides of the optical waveguides 18.

The fixing member 4, which has a isosceles trapezoidal cross section, is pushed into the depression 6 from the side of the coupling end face 8. In this case, the side walls 16 of the depression 6, which form the guide structures 16 on the side of the base member, prevent the fixing member 4 from moving in a direction transverse to the inserted optical waveguides 18. In the pushed-in state of the fixing member 4, the inclined side faces 24 of the fixing member 4 lie flat against the side walls 16 of the depression 6. The fixing member 4 is pressed with its underside 26 against the optical waveguides 18 due to the inclined position of the side walls 16, which are on the side of the base member, and side faces 24, which are on the side of the fixing member and enclose an angle of less than 90° with the bottom surface 10 of the depression 6. As a result, the fixing member 4 is clamped, and also the optical waveguide 18 is fixed in the longitudinal grooves 14. The grooves can likewise be recessed in the underside of the fixing member.

Figure 2:
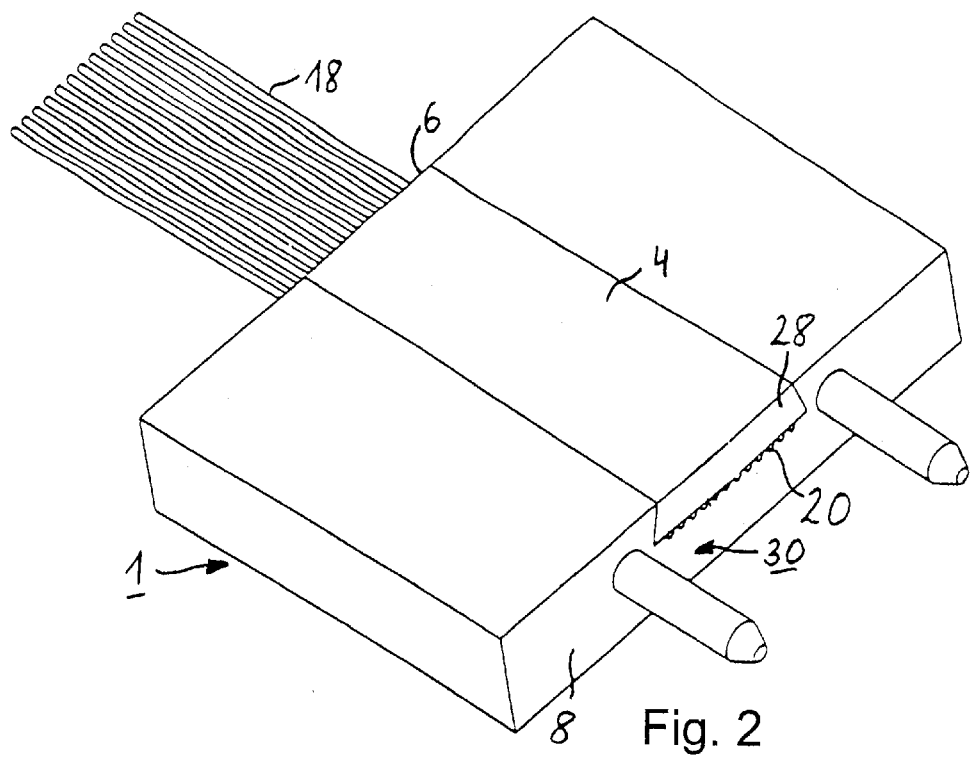
FIG. 2 is a perspective view of a fiber-optic endpiece with a pushed-in fixing member.

An assembled fiber-optic endpiece 1 is illustrated in FIG. 2. The fixing member 4 is pushed completely into the depression 6 and clamped therein. In this case, the fixing member 4 terminates with its front face 28 such that it is flush with the ends 20 of the optical waveguides 18 and the coupling end face 8. The optical waveguide ends 20 can be polished at this common face 30 formed together with the front face 28 and the coupling end face 8. The common face 30 serves subsequently as coupling surface for coupling the optical waveguides 18 to electro-optic components, or for a coupling to other optical waveguides. In order to diminish disturbing reflections, the common face 30 can be at an oblique angle with respect to the longitudinal axis of the optical waveguides 18. To the extent that the fixing member 4 projects beyond the coupling end face 8 after being pushed in, the common face 30 is created by a subsequent polishing.

Figure 3:
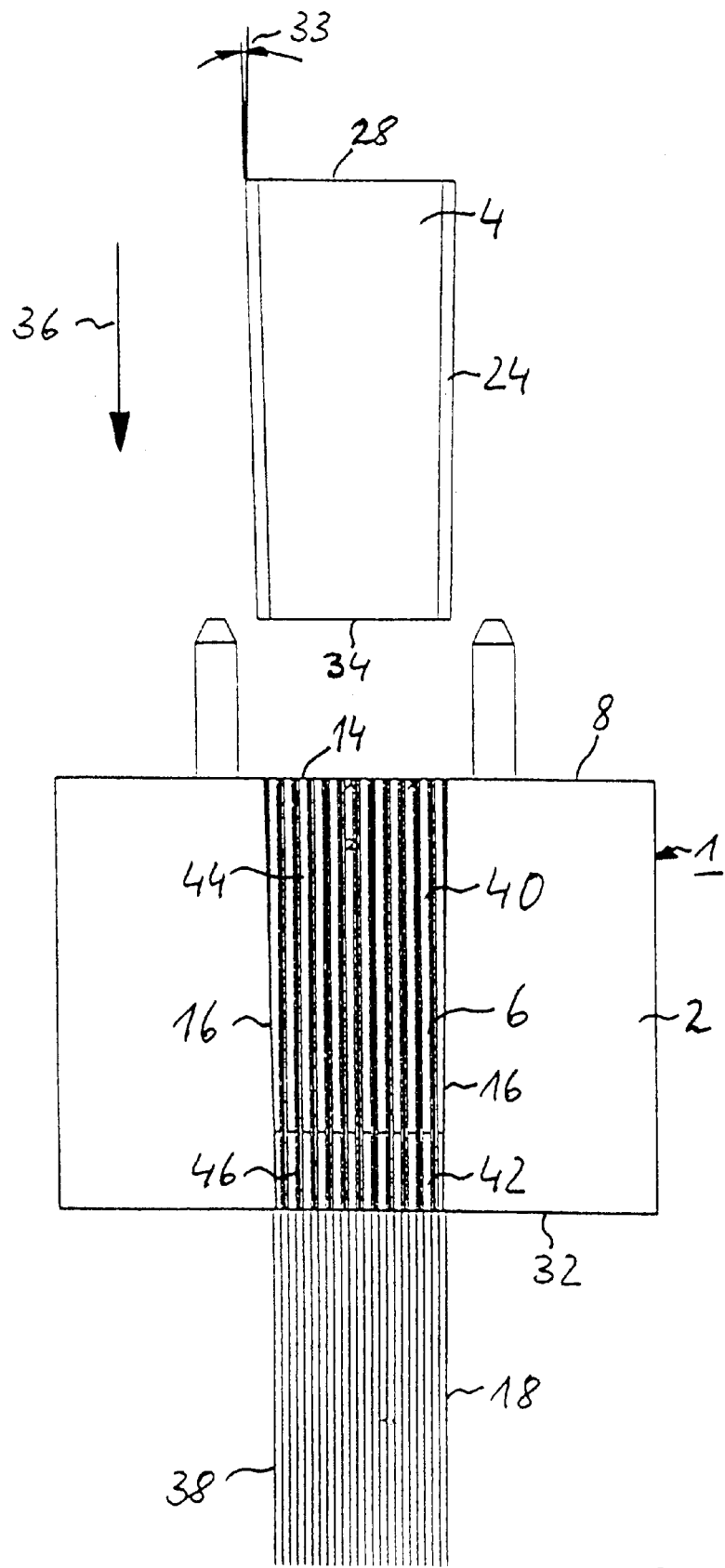
FIG. 3 is a top view of a fiber-optic endpiece.

The inventive configuration of the depression 6 and of the fixing member 4 for achieving an optimum clamping action is illustrated in FIG. 3. The depression 6 is wider at the coupling end face 8 than at the rear side 32 of the base member 2 opposite the coupling end face 8. The reduction in cross section associated therewith increases uniformly over the entire length of the depression 6, with the result that the side walls 16 are respectively at an acute angle 33 to the push-in direction 36. The angle 33 is preferably between 1° and 5°. The fixing member 4 changes its cross section according to the change in the cross section of the depression 6. As a result, the fixing member can initially be pushed in or inserted, with its narrow end 34 first, without any clamping action. The inserting without a clamping action continues until the side faces 24 of the fixing member 4 come into full contact with the side walls 16 of the depression 6 on both sides and rub against one another. The change in cross section of the depression 6 and fixing member 4 are matched such that the self-locking of the movement in the push-in direction 36 corresponds to uniformly pressing the optical waveguides 18 into the longitudinal grooves 14. At the same time, the front face 28 of the fixing member 4 terminates flush with the coupling end face 8. An adequate clamping action can also be achieved by a continuous decrease in the thickness 35 of the fixing member 4, or in the height 37 of the depression 6 in the push-in direction 36.

The fixing member 4 fixes both the optical waveguide end sections 40 freed from their sheaths 38, and also the still completely sheathed optical waveguide sections 42. The unsheathed sections 40 therefore lie in the region 44 close to the end face, while the completely sheathed sections 42 lie in the rear region 46 of the depression 6 and are therefore held in the endpiece 1 such that they are protected against mechanical loads. The width of the grooves 14 decreases in a step-wise fashion in the direction of the coupling end face 8 in accordance with the change in cross section of the partially unsheathed optical waveguides 18, with the result that the optical waveguides 18 always lie in the plane 12. After the fixing member 4 has been pushed in completely, it can be fixed permanently in the depression 6 together with the optical waveguides 18 through the use of an adhesive. The adhesive passes, due to capillary forces, up to the coupling end face 8 during the application of a desired amount of adhesive, for example in the rear-side region 46 of the depression 6. The adhesive can, however, also be applied as early as during the joining of the base member 2 and fixing member 4.

Figure 4:
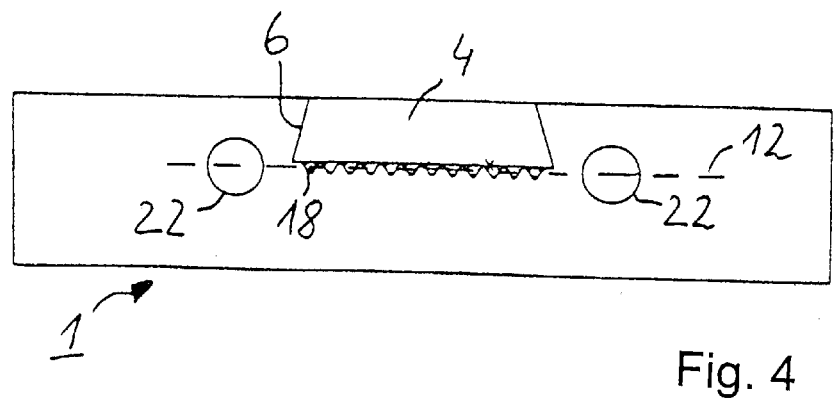
FIG. 4 is a front view of a fiber-optic endpiece.
Figure 5:
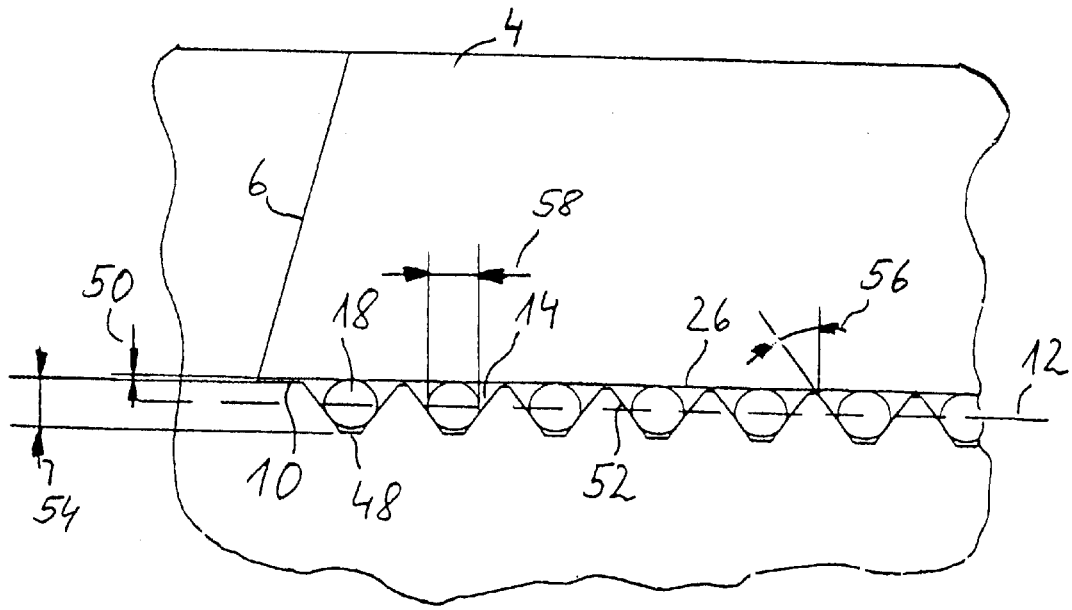
FIG. 5 is an enlarged, partial sectional front view of a fiber-optic endpiece.

FIGS. 4 and 5 show the end face of the fiber-optic endpiece 1. The optical waveguides 18 are provided in the plane 12 in which the aligning pins 22 are also placed. The cross section of the V-shaped longitudinal grooves 14 has a blunt end or bottom 48 here. The optical waveguides 18 bear along a line running parallel to the optical waveguide axis against the flanks 52 of the longitudinal grooves 14, but not against the blunt ends 48 thereof, and project by the measure or distance 50 beyond the bottom surface 10 of the depression. The measure 50 results from the depth 54 and the flank angle 56 of the longitudinal grooves 14 and the diameter 58 of the optical waveguides and is, for example, 10 to 20 μm. The fixing member 4 clamped onto the optical waveguides 18 touches only the optical waveguides 18 with its underside 26, and does not bear against the base surface 10 of the depression 6. The optical waveguides 18 are thus exactly positioned with respect to their cross sections by using a three-point support.

I claim:

1. In combination with an optical waveguide, a fiber-optic endpiece, comprising:

a base member having a coupling end face, said base member formed with a depression defining a bottom surface and lateral guide structures, said bottom surface formed with a groove for accepting the optical waveguide, said depression defining a longitudinal direction;

a fixing member having a front face, a rear face and guide faces, said fixing member being insertable into said depression along said lateral guide structures and defining an inserted position, said guide faces being adapted to said guide structures and interacting with said guide structures, said fixing member, when in the inserted position, being clamped in said depression for holding the optical waveguide in said groove;

said depression, said groove and the optical waveguide extending to said coupling end face;

said coupling end face and said front face defining a common plane, when said fixing member is in the inserted position; and said depression and said fixing member having respective cross sections, at least one of said respective cross sections diminishing uniformly in the longitudinal direction and having a side with a reduced cross section opposite from said coupling end face.

2. The fiber-optic endpiece according to claim 1, including:

a plurality of V-shaped grooves disposed parallel to one another in a given plane for a corresponding plurality of optical waveguides; and aligning devices disposed on said coupling end face and extending in the given plane and parallel to said plurality of V-shaped grooves.

3. The fiber-optic endpiece according to claim 1, wherein said respective cross sections are trapezoidal cross sections transverse to the longitudinal direction, the trapezoidal cross sections having a bottom side at said bottom surface and a top side, said bottom side being wider than said top side.

* * * * *